US012348465B2

(12) United States Patent
Lee et al.

(10) Patent No.: US 12,348,465 B2
(45) Date of Patent: Jul. 1, 2025

(54) FACILITATING USER ACTIONS FOR VIRTUAL INTERACTIONS

(71) Applicant: Zoom Video Communications, Inc., San Jose, CA (US)

(72) Inventors: Bilung Lee, San Jose, CA (US); Vijay Venkataswamy Parthasarathy, San Jose, CA (US); Chih-Kai Ting, Milpitas, CA (US); Bing Zhao, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/139,059

(22) Filed: Apr. 25, 2023

(65) Prior Publication Data

US 2024/0364647 A1   Oct. 31, 2024

(51) Int. Cl.

| G06F 9/451 | (2018.01) |
|---|---|
| G06F 3/0482 | (2013.01) |
| G06F 40/279 | (2020.01) |
| G06F 40/35 | (2020.01) |
| H04L 51/02 | (2022.01) |
| H04L 51/046 | (2022.01) |
| H04L 51/18 | (2022.01) |

(52) U.S. Cl.
CPC .......... *H04L 51/046* (2013.01); *G06F 3/0482* (2013.01); *G06F 9/451* (2018.02); *G06F 40/279* (2020.01); *G06F 40/35* (2020.01); *H04L 51/02* (2013.01); *H04L 51/18* (2013.01)

(58) Field of Classification Search
CPC ....... H04L 51/046; H04L 51/02; H04L 51/18; G06F 3/0482; G06F 9/451; G06F 40/279; G06F 40/35
See application file for complete search history.

(56) References Cited

U.S. PATENT DOCUMENTS

| 8,166,019 | B1 * | 4/2012 | Lee ..................... | G06Q 10/1093 |
|---|---|---|---|---|
| | | | | 707/963 |
| 9,443,232 | B1 * | 9/2016 | Silva .................. | G06Q 10/1095 |
| 10,223,066 | B2 * | 3/2019 | Martel .................... | G10L 15/30 |
| 10,348,658 | B2 * | 7/2019 | Rodriguez ............ | H04L 65/762 |
| 10,530,723 | B2 | 1/2020 | Milligan et al. | |
| 10,873,545 | B2 * | 12/2020 | Nguyen ................. | G06N 20/00 |
| 11,159,767 | B1 * | 10/2021 | Kamisetty ........... | G06F 16/9536 |

(Continued)

OTHER PUBLICATIONS

U.S. Appl. No. 17/162,082, "Final Office Action", Mar. 24, 2023, 10 pages.

(Continued)

*Primary Examiner* — Yongjia Pan
(74) *Attorney, Agent, or Firm* — Kilpatrick Townsend & Stockton LLP

(57) ABSTRACT

Example methods and systems facilitate user actions during a chat session on an online chat platform. A client device is installed with a chat and video conference application. The chat and video conference application includes a machine learning (ML) model. The client device receives a chat message during a chat session and identifies an action item from the chat message using the ML model. One or more GUI elements can be generated associated with a functionality of an application corresponding to the action item. A GUI element can be activated to invoke the functionality of the application.

20 Claims, 11 Drawing Sheets

(56) References Cited

U.S. PATENT DOCUMENTS

| | | | |
|---|---|---|---|
| 11,368,423 B1* | 6/2022 | Plater-Zyberk | G06Q 30/0631 |
| 11,403,123 B2* | 8/2022 | Krishna | G06N 5/04 |
| 11,468,282 B2* | 10/2022 | Sanghavi | G06N 3/006 |
| 11,502,975 B2* | 11/2022 | Gershony | H04L 51/04 |
| 11,734,581 B1* | 8/2023 | Badr | G06F 21/44 |
| | | | 719/328 |
| 12,014,731 B2 | 6/2024 | Lum | |
| 2005/0232423 A1 | 10/2005 | Horvitz et al. | |
| 2008/0201434 A1* | 8/2008 | Holmes | G06F 16/951 |
| | | | 709/206 |
| 2014/0164305 A1 | 6/2014 | Lynch et al. | |
| 2014/0244243 A1* | 8/2014 | Kim | G06F 40/274 |
| | | | 704/9 |
| 2016/0055246 A1* | 2/2016 | Marcin | G06F 16/9535 |
| | | | 707/732 |
| 2016/0077794 A1 | 3/2016 | Kim et al. | |
| 2016/0301639 A1* | 10/2016 | Liu | H04L 51/52 |
| 2017/0026318 A1* | 1/2017 | Daniel | H04L 51/046 |
| 2017/0132518 A1* | 5/2017 | Kitada | H04N 7/147 |
| 2017/0161258 A1* | 6/2017 | Astigarraga | G06Q 10/10 |
| 2017/0180276 A1* | 6/2017 | Gershony | H04L 51/222 |
| 2017/0250935 A1* | 8/2017 | Rosenberg | H04L 51/02 |
| 2017/0330195 A1* | 11/2017 | Lange | G06F 3/04817 |
| 2017/0339085 A1* | 11/2017 | Judd | H04L 67/34 |
| 2017/0374176 A1 | 12/2017 | Agrawal et al. | |
| 2018/0268372 A1 | 9/2018 | Bussiek | |
| 2018/0367483 A1* | 12/2018 | Rodriguez | H04L 51/046 |
| 2018/0367484 A1* | 12/2018 | Rodriguez | H04L 67/75 |
| 2019/0057698 A1 | 2/2019 | Raanani et al. | |
| 2019/0189117 A1 | 6/2019 | Kumar | |
| 2020/0036658 A1* | 1/2020 | Elango | H04L 51/02 |
| 2020/0092243 A1* | 3/2020 | Milligan | H04L 51/216 |
| 2020/0258525 A1* | 8/2020 | McQuiston | G06Q 10/109 |
| 2020/0321005 A1 | 10/2020 | Iyer et al. | |
| 2021/0097502 A1* | 4/2021 | Hilleli | G06N 3/08 |
| 2021/0112022 A1* | 4/2021 | Nguyen | G06F 16/2365 |
| 2021/0157618 A1* | 5/2021 | Moon | H04L 51/02 |
| 2021/0334473 A1 | 10/2021 | Trehan | |
| 2021/0357496 A1 | 11/2021 | Lewis et al. | |
| 2021/0389868 A1 | 12/2021 | Crowder | |
| 2022/0122583 A1 | 4/2022 | Bates | |
| 2022/0139383 A1 | 5/2022 | Rose et al. | |
| 2022/0246145 A1 | 8/2022 | Lum | |
| 2022/0263877 A1 | 8/2022 | Conlin et al. | |
| 2022/0337536 A1 | 10/2022 | Meersma et al. | |
| 2023/0403174 A1* | 12/2023 | Mohanty | H04L 12/1831 |
| 2024/0121204 A1* | 4/2024 | Zhang | H04L 51/046 |

OTHER PUBLICATIONS

U.S. Appl. No. 17/162,082, "Non-Final Office Action", Sep. 28, 2022, 10 pages.

Chourasia, "Best A 1 Assistant of 2021", Tech Research Online, Aug. 5, 2020, 10 pages.

U.S. Appl. No. 17/162,082, "Notice of Allowance", Apr. 16, 2024, 8 pages.

U.S. Appl. No. 17/162,082, "Notice of Allowance", Dec. 21, 2023, 5 pages.

EP International Search Report and Written Opinion for PCT/US2024/021652 mailed Jul. 3, 2024.

* cited by examiner

FACILITATING USER ACTIONS FOR VIRTUAL INTERACTIONS

FIELD

The present application generally relates to online chat channels and more specifically relates to facilitating user actions for virtual interactions on online chat channels.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
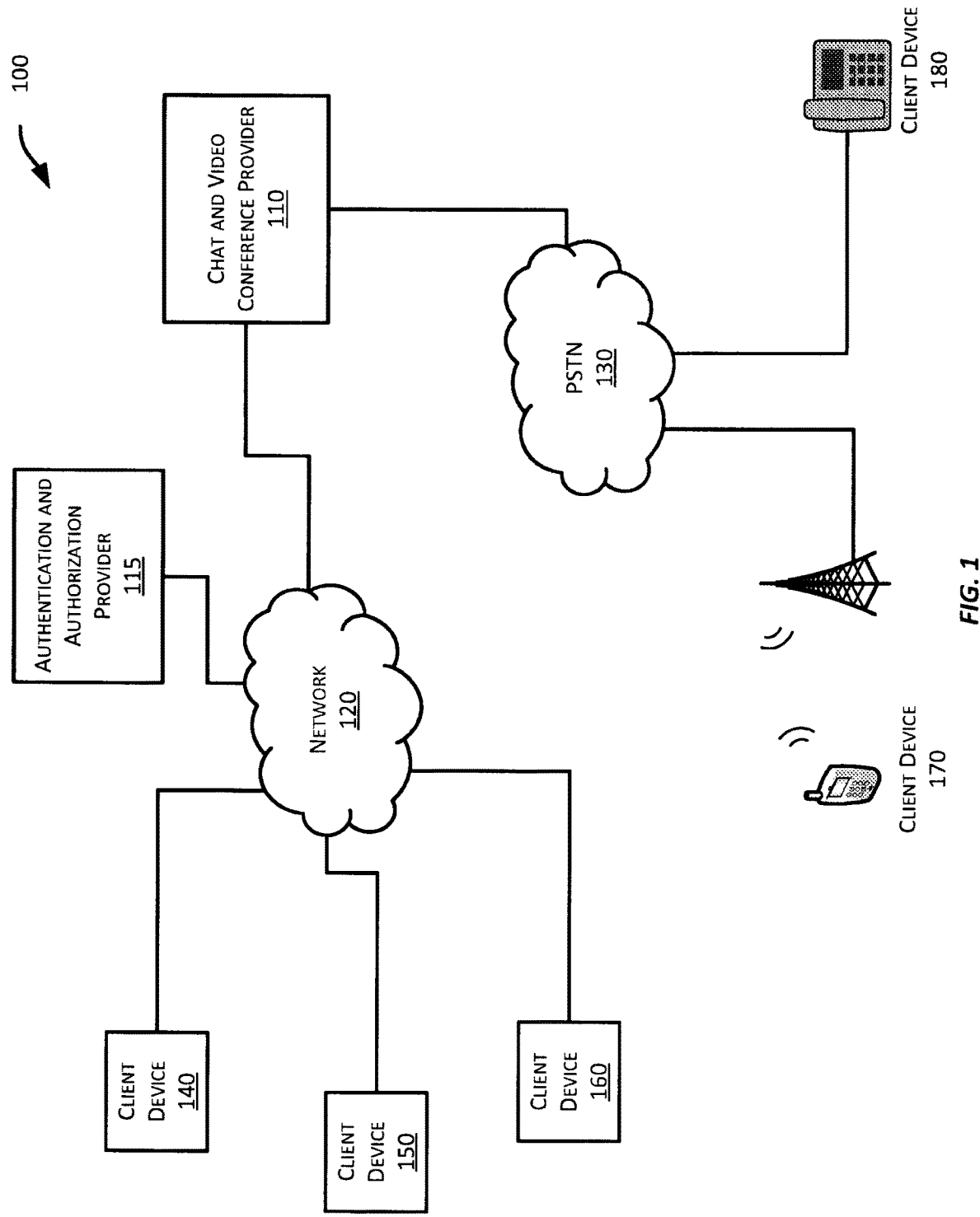
FIG. 1 shows an example system that provides videoconferencing and chat functionality to various client devices.

Examples are described herein in the context of facilitating user actions for virtual interactions. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During virtual interactions, such as online chats, video conferences, or any other online interactions, users may need to switch from one application to another application for certain actions. For example, a user may need to open an online calendar (e.g., Outlook calendar) to check what time the user is available for scheduling an activity with another user while chatting with the other user. However, switching between different applications may be time consuming, interrupt the flow of the virtual interaction, and be prone to error while multitasking. Meanwhile, some actions may not have to be taken during the virtual interaction. However, if the user did not take notes, or could not take notes, the user may forget these to-be-taken actions after the virtual interaction.

To facilitate user actions during a virtual interaction, the present disclosure provides techniques for generating GUI elements in the GUI of the application for virtual interaction. The GUI elements can be associated with a certain functionality of an external application. Activating a GUI element can invoke the associated functionality of the external application automatically without the user manually launching the external application.

For example, a first user is chatting with a second user during a chat session on an online chat platform. The first user uses a first client device and the second user uses a second client device. Both the first client device and the second device are installed with a client application provided by the online chat platform. The first client device receives a chat message via the online chat platform. The chat message can be from the first user or the second user. The client application on the first client device uses a machine learning (ML) model, for example a classification model, to determine if the chat message includes an action item based on the chat message and some chat messages before the chat message. If the ML model identifies an action item, the client application then determines which application to execute the action item. The client application then generates a GUI element associated with a functionality of the external application corresponding to the action item. The GUI element is displayed in the GUI of the client application for the chat session with the second user. The first user can activate the GUI element by clicking or touching to invoke the functionality of the external application.

For example, the chat message is from the second user to the first user that "when are you going to talk with Vijay?" The ML model on the first client device identifies an action item for the first user, that is to check if the first user has a meeting scheduled with Vijay on the first user's calendar. The ML model then accesses the first user's calendar. If the ML model finds that the first user has a meeting scheduled with Vijay at 3 pm on Sunday, the client application on the first client device generates a button with a short description of the meeting. The button is connected to the meeting scheduled on the first user's calendar. The first user can click the button to open the scheduled page on the calendar for verification.

Meanwhile, the client application can automatically compose a chat message for the first user to the second user. Here, since the ML model finds the first user has a meeting scheduled with Vijay on Sunday, the ML model composes a reply message to the second user's message that "when are you going to talk with Vijay?" The reply message can be composed as "My meeting with Vijay is at 3 pm on Sunday" in the reply panel. The first user can edit it before sending it out.

In addition, the client application provides a summary of action items after the chat session. The first user may have taken action on some of the action items, but not on other action items. The summary of action items can include a list of action items that the first user has taken action on during the chat session and a list of action items that the user needs to take action on after the chat session. The summary can also include GUI elements for facilitating the first user to take action on the action items that are not yet taken action on.

Thus, this example provides GUI elements for facilitating user actions during a chat session. The GUI elements are associated with a functionality of an external application corresponding to an identified action item. The GUI elements are displayed in the GUI of the chat session so that the user can take action quicky and directly without minimizing the client application, launching the external application, invoking a corresponding functionality, etc. to take action on the action item. Meanwhile, a summary of action items can further assist the user and save time. The user does not need to write down any after-session steps during the virtual interaction session. The summary includes all action items so that the user has a full picture of the actions spawn out of the virtual interaction session.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
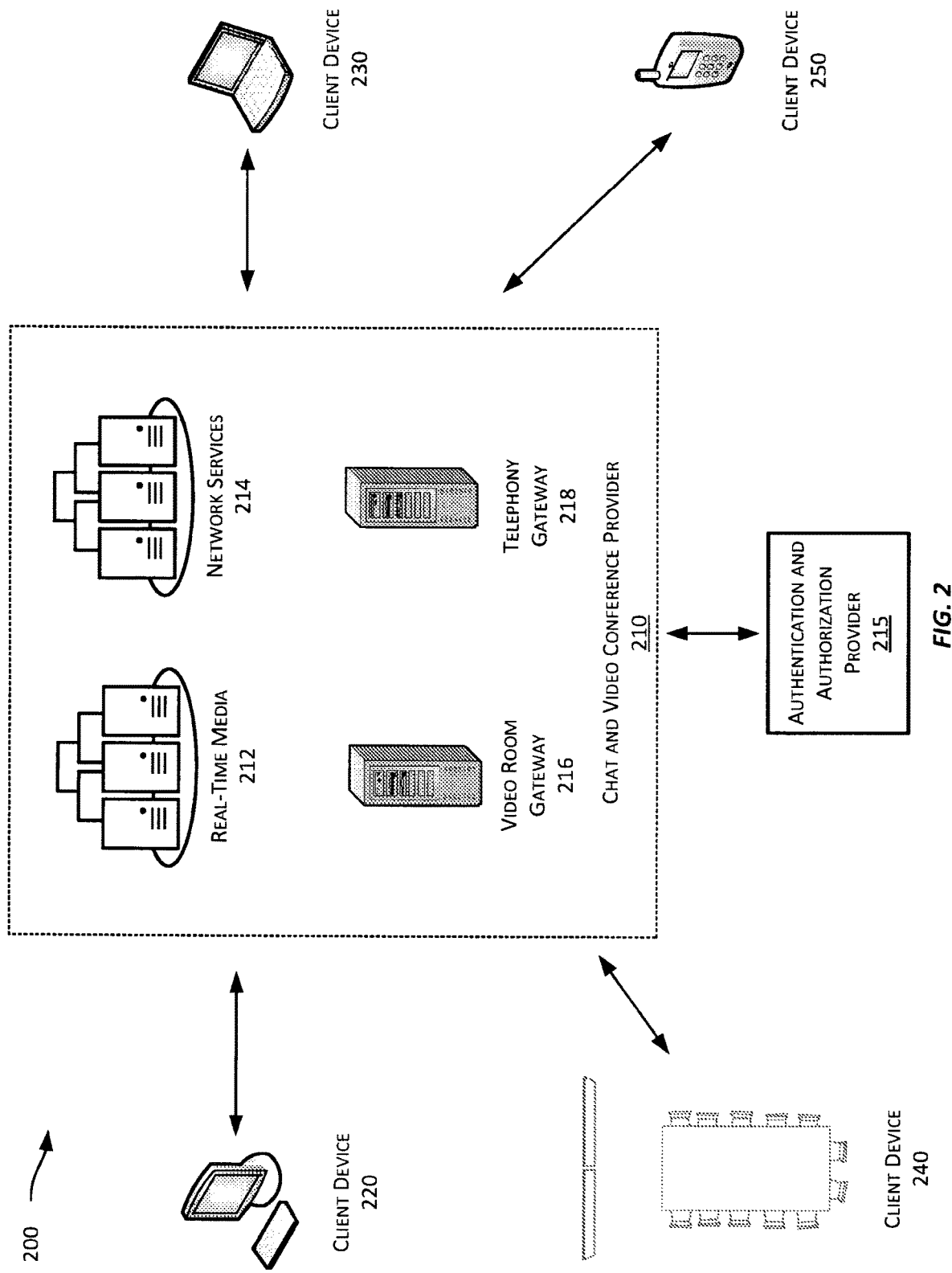
FIG. 2 shows an example system in which a chat and video conference provider provides videoconferencing and chat functionality to various client device.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
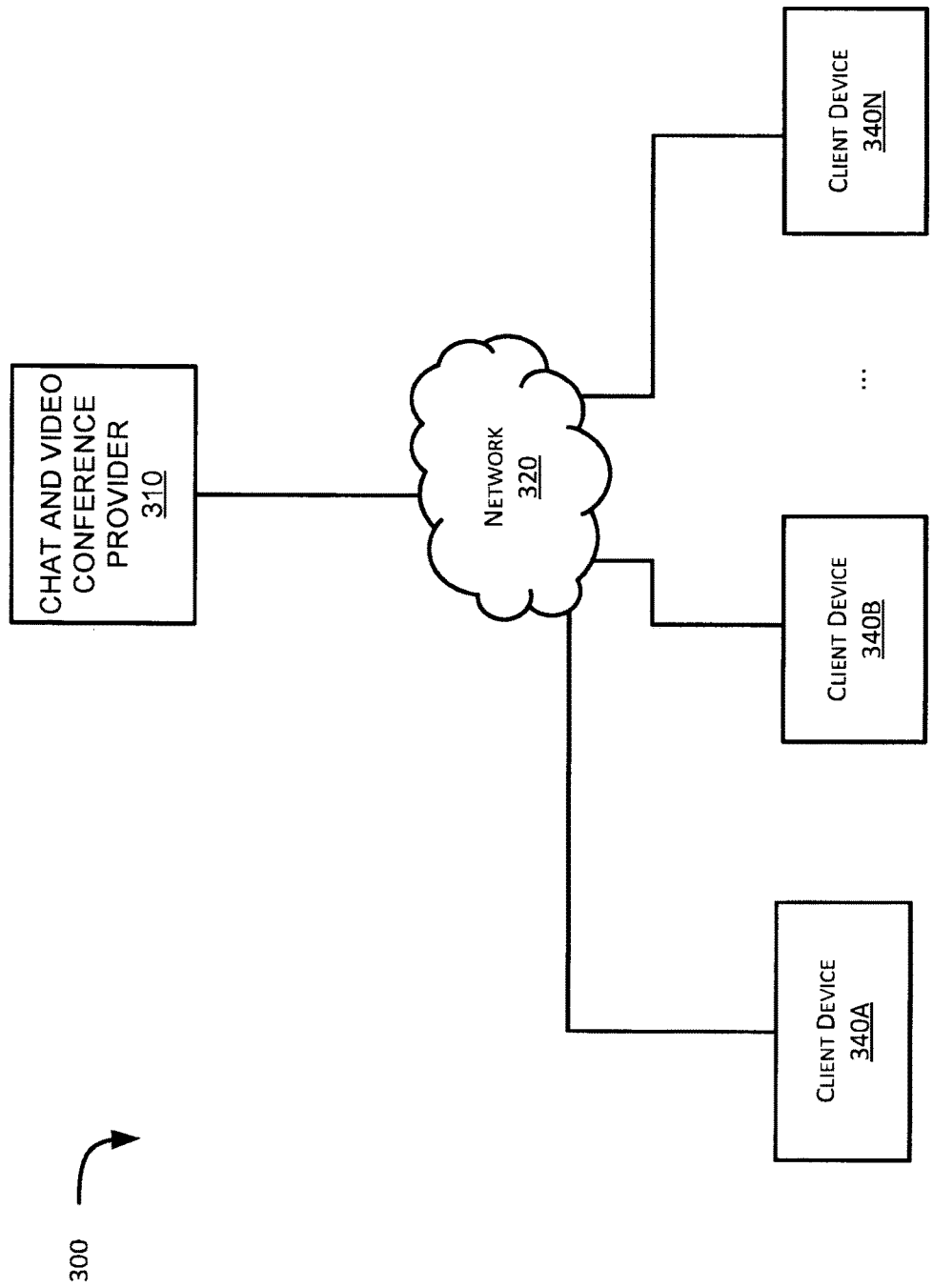
FIG. 3 shows an example system that facilitate user actions for virtual interactions.

Referring now to FIG. 3, FIG. 3 shows an example system 300 that facilitate user actions for virtual interactions. In this example system 300, a chat and video conference provider 310 and a number of client device 340A-340N (which may be referred to herein individually as a client device 340 or collectively as the client devices 340) are connected via a network 320. The chat and video conference provider 310 can be the chat and video conference provider 110 in FIG. 1 or the chat and video conference provider 210 in FIG. 2. The network 320 can be the internet or any suitable communications network or combination of communications network may be employed, including LANs (e.g., within a corporate private LAN), WANs, MANs, cellular network (e.g., 3G, 4G, 4G LTE, 5G, etc.), or any combination of these.

The client devices 340 can be any suitable computing or communications device. The client device 340 can be a client device (e.g., 140, 150, 160, or 170) in FIG. 1 or a client device (e.g., 220, 230, or 250) in FIG. 2. For example, client devices 340 may be desktop computers, laptop computers, tablets, smart phones having processors and computer-readable media, connected to the chat and video conference provider 310 using the internet or other suitable computer network. The client devices 340 have chat and video conference software installed to enable them to connect to the chat and video conference provider 310. During a chat session, a user associated a client device (e.g., client device 340A) can interact with other users associated with other client devices (e.g., client device 340B-340N) via the chat and video conference provider 310 by sending and receiving chat messages, and reacting to received chat messages.

Figure 4:
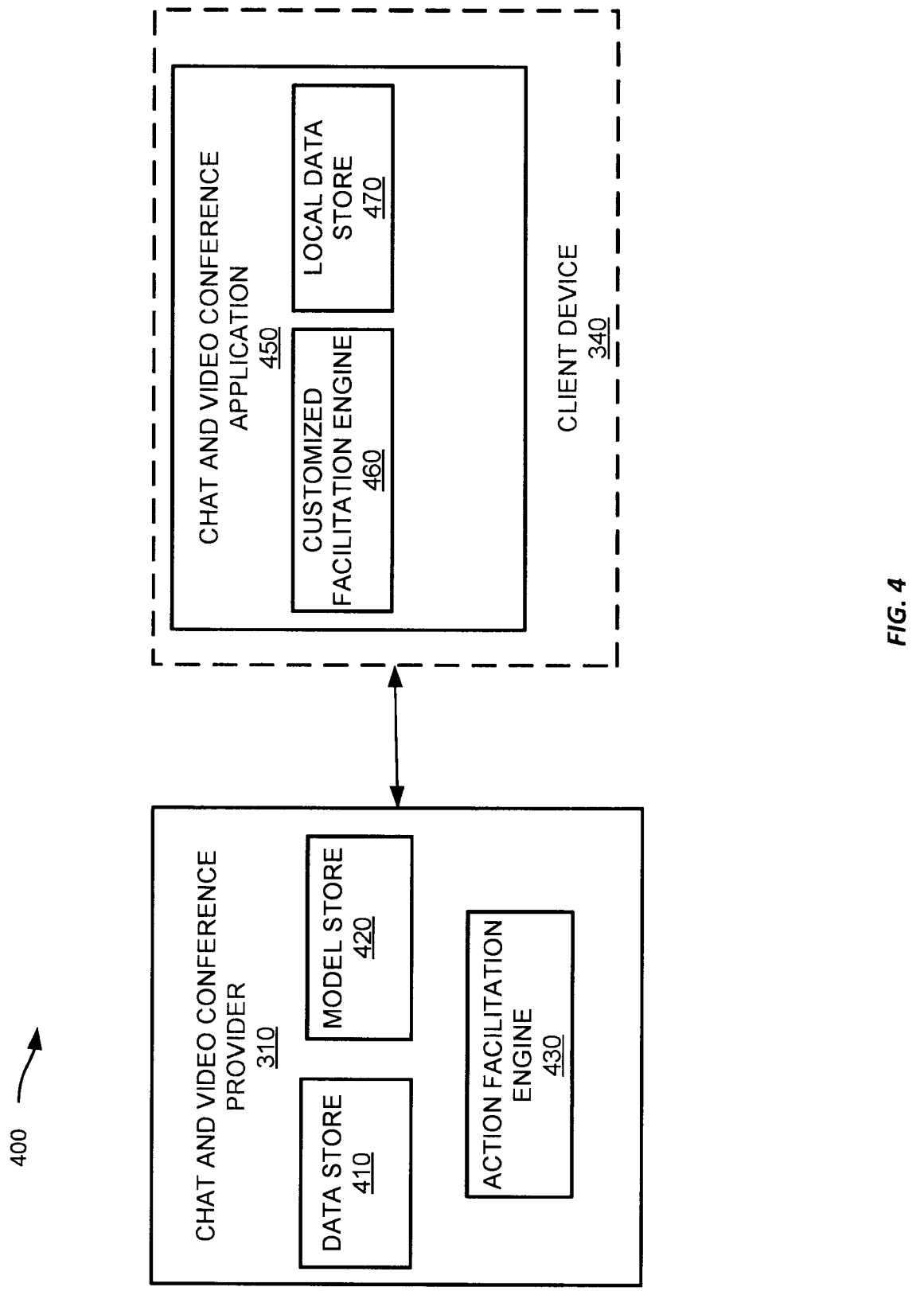
FIG. 4 shows an example system that is configured to facilitate user actions during a virtual interaction.

Now referring to FIG. 4, FIG. 4 shows an example system 400 that is configured to facilitate user actions during a virtual interaction. The chat and video conference provider 310 is in network communication with a client device 340. The client device 340 is installed with a chat and video conference application provided by the chat and video conference provider 310.

The chat and video conference provider 310 includes a data store 410 and a model store 420. The data store 410 stores historical chat data from different client devices 340. The historical chat data can include message identifications, channel identifications, parent message identification (if any), sender identification, message content, send time, reply to the message (if any), and reply time (if any). The data store 410 can also store user metadata. The user metadata includes user profile data, for example, title, team, location, chat channels, chat contacts, and any information included in the user profile on the chat and video conference platform. The user metadata also includes user activity data, such as what actions the user takes after each chat message (e.g., checking online calendar, scheduling video meeting, etc.).

The model store 420 includes different AI/ML models for facilitating user actions during a virtual interaction. Various types of models or artificial intelligence algorithms may be used in example systems. For example, simple machine learning models, such as Linear Regression and Gradient Boosting may be used. In other examples, more sophisticated models, such as Factorization Machines ("FM"). As more data is available in a system according to these examples, deep learning models may be utilized, such as DeepFM and Wide&Deep or other similar models. Other alternative machine-learning models that might be used include a deep convolutional neural network ("CNN"), a residual neural network ("Resnet"), or a recurrent neural network, e.g., long short-term memory ("LSTM") models or gated recurrent units ("GRUs") models. The machine-learning model can also be any other suitable machine-learning model, such as a three-dimensional CNN ("3DCNN"), a dynamic time warping ("DTW") technique, a hidden Markov model ("HMM"), etc., or combinations of one or more of such techniques—e.g., CNN-HMM or MCNN (Multi-Scale Convolutional Neural Network). Further, some examples may employ adversarial networks, such as generative adversarial networks ("GANs"), or may employ autoencoders ("AEs") in conjunction with machine-learning models, such as AEGANs or variational AEGANs ("VAE-GANs"). Alternatively, some machine-learning models may use transformer networks or self-attention based neural networks. In addition, the models or artificial intelligence algorithms in the model store can be supervised or unsupervised learning models.

In some examples, the chat and video conference provider 310 is configured to select an ML model from the model store 330 and train the ML model for classification. Classification can be a task for matching an item with a class or group based on natural language processing. The classification model can be based on logistic regression, decision tree, random forest, support vector machine, K-nearest neighbor, naive Bayes, stochastic gradient descent, or any suitable ML algorithms for classification.

During the training phase, the chat and video conference provider 310 receives a training dataset. In some examples, the training dataset include historical chat messages and action item labels. Certain features can be derived from the historical chat messages for classifying the corresponding chat messages into certain action categories. some of the features may include keywords associated with certain user actions. For example, time related words may be associated with an action on the calendar. Also, for example, "schedule a meeting" or alternative phrases may trigger an action for creating a virtual meeting. In some examples, the training dataset includes historical chat messages and user metadata. The historical chat messages are not labeled with any action item labels. The user metadata can include user profile data, for example, title, team, location, chat channels, chat contacts, and any information included in the user profile on the chat and video conference platform. The user metadata can also include user activity data, for example, user actions associated with the chat messages and user interactions with other applications on the chat and video conference platform. The chat and video conference provider 310 can train the ML model to extract features from the historical chat messages and identify action items to create action categories. The action categories can be encoded in the classification model. The action categories correspond to a functionality of an application that can execute the corresponding action items.

In some examples, the chat and video conference provider 310 trains and stores multiple classification models for different user groups or chat channels. The chat and video conference provider 310 can generate different user groups based on the user profile data stored in the data store 410. Certain user groups may have their frequent action items appear in their chat messages. Also, certain chat channels, especially chat channels based on work groups, can have their preferred action items.

In some examples, the chat and video conference provider 310 includes an action facilitation engine 430 configured to determine action items in chat messages and determine an internal or external application to execute the action items. The internal application can be another application provided by the chat and video conference provider 310, other than the chat and video conference application 450. The external application can be an application provided by a third-party provider. Either the internal application or the external application can be integrated with the chat and video conference application 450. The action facilitation engine 430 may implement an ML model that is not tailored to any specific user but apply to various users. In some examples, the action facilitation engine 430 implements a trained ML model for action facilitation stored in the model store 420 corresponding to the user group that the user belongs to. Alternative, the action facilitation engine 430 can include the multiple trained ML models for action facilitation from the model store 420 and select one trained model based on the user group of the user to facilitate the user. In some examples, the ML model includes a map between action categories and functionalities of applications or applications that can execute action items in corresponding action categories. Even though in this example an ML model is used in for action facilitation, the action facilitation engine 430 is not limited to using an ML model for identifying action items and determining external applications to execute the action items. The action facilitation engine 430 can implement any suitable models or algorithms.

The action facilitation engine 430 on the chat and video conference provider 310 is not limited to identify action items in chat messages and determine applications to execute the identified action items for chat session. The action facilitation engine 430 can also identify action items during video conferences, which can be triggered from in-meeting real-time speech transcriptions. Names of the participants in a virtual conference can be available to the video conference provider 310. The action facilitation engine 430 can automatically tag the relevant participant with suggested actions.

The chat and video conference application 450 installed on the client device 340 includes a user facilitation engine 460 and a local data store 470. The local data store 470 stores chat data and user metadata for the user associated with the client device 440. The local data store 380 also stores feedback input from the user regarding the accuracy of the identified action items. In some examples, the user facilitation engine 460 is part of the chat and video conference application 450. In some examples, the user facilitation engine 460 is an independent application integrated into the chat and video conference application 350 as microservices. The independent application can be provided by the chat and video conference provider 310. Alternatively, the independent application can be provided by a third-party provider.

In some examples, the chat and video conference application 450 includes the user facilitation engine 460 for identifying action items from chat messages and determining applications to execute corresponding action items, even if the chat and video conference provider 310 includes an action facilitation engine 430 configured with the same functionality. In some examples, the chat and video conference provider 310 selects a trained ML model for action facilitation to be initially implemented by the user facilitation engine 460. For example, the chat and video conference provider 310 can determine a user group for the user associated with the client device 340 based on user profile data. The chat and video conference provider 310 then transmits a trained ML model corresponding to the user group to the chat and video conference application 450 installed on the client device 340. The chat and video conference application 450 can implement the trained ML model for action facilitation corresponding to the user group in the user facilitation engine 460.

When the chat and video conference application 450 is just installed on the client device 340, few data for the user associated with the client device 340 is collected or stored at the local data store 480. As more chat data, user metadata, and feedback input from the user associated with client device 340 is collected, the ML model implemented in the user facilitation engine 460 can learn and tune user specific features and corresponding action categories to more accurately identify action items to the user. Even though in this example an ML-based model is used for building the classification model implemented in the user facilitation engine 460, the user facilitation engine 460 is not limited to using an ML model for predicting action items from chat messages. The user facilitation engine 460 can implement any suitable models or algorithms.

The chat and video conference application 450 is integrated with other applications associated with action items identified by the user facilitation engine 460. The user facilitation engine 460 is also configured to generate a GUI element associated with a functionality of a second application corresponding to an identified action item. The second application can be another application integrated with the chat and video conference application 450. Alternatively, or additionally, the second application is the same chat and video conference application 450 which includes a different functionality besides chat, for example video conferencing, phone calls, etc. In some examples, the user facilitation engine 460 does not include an ML model or other algorithm for identifying action items from chat messages and determining applications to execute corresponding action items. The action facilitation engine 430 on the chat and video conference provider 310 can identify the action items and determine the applications to execute corresponding action items, and transmit such information to the user facilitation engine 460 on the client device 340. The user facilitation engine 460 can generate GUI elements associated with the applications to execute corresponding action items. The chat and video conference application 450 can provide a GUI for participants to interact with each other via the chat and video conference provider 310. The GUI elements associated with other applications to execute action items can be displayed in the GUI of the chat and video conference application 450. In some examples, virtual conferences between participants are established via the GUI of the chat and video conference application 450. The GUI may include components for scraping video signals during video conferences, for example performing Optical Character Recognition (OCR) to detect and extract text within video streams, including participant names and materials shown on the screen (e.g., presentation slides, histogram chart, etc.). Video scraping can enhance action facilitation by disambiguating entities in action.

Figure 5:
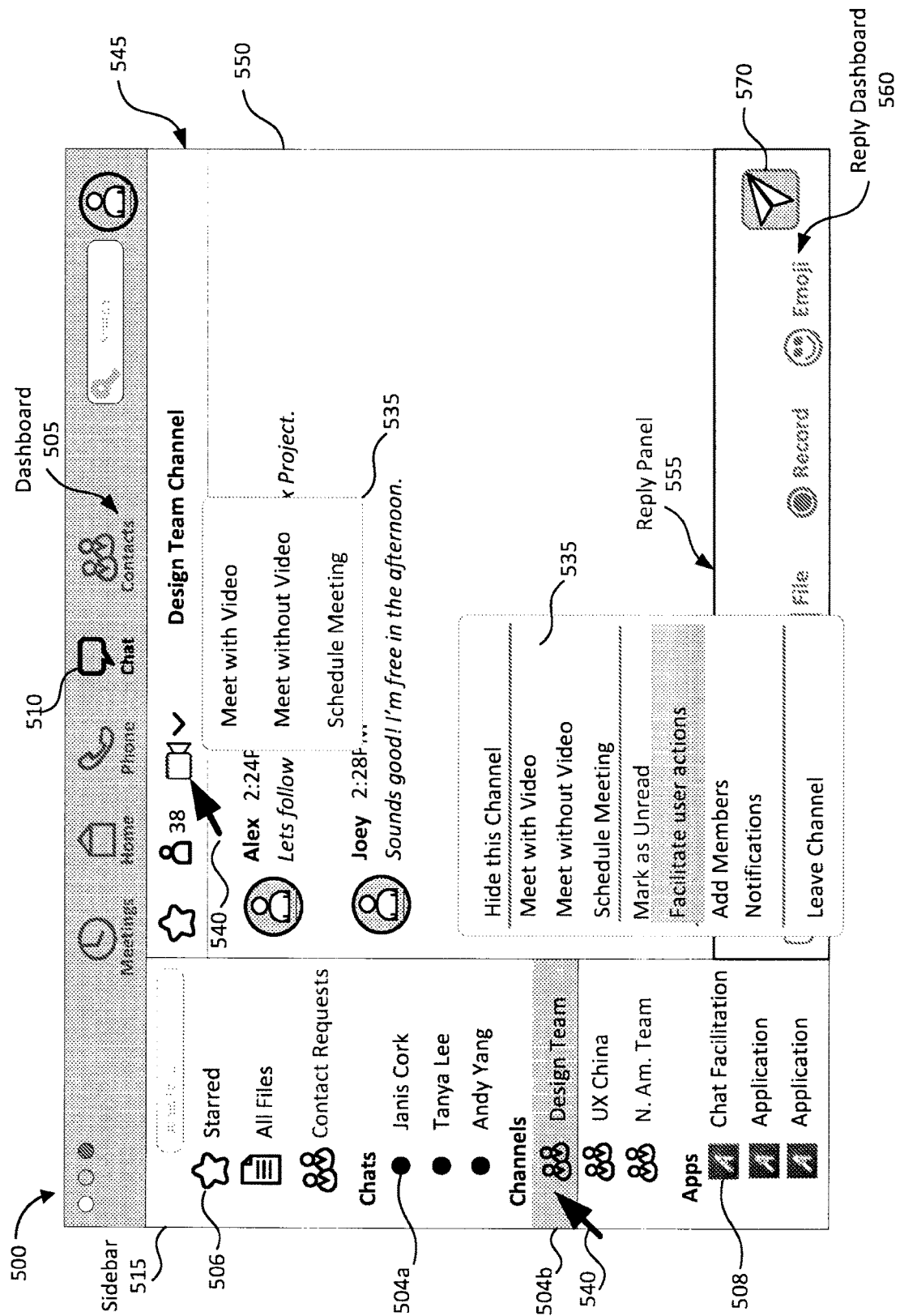
FIG. 5 shows an example master chat panel.

Now referring to FIG. 5, FIG. 5 shows an example master chat panel 500. The master chat panel 500 may be displayed on a client device 340 in response to information sent by a chat and video conference provider, such as the chat and video conference provider 310 in FIG. 3. The master chat panel 500 may be generated by a chat application run by one or more processors stored on the client device 340. In some examples, the application is a standalone chat client. In some examples, the application is integrated into a video conferencing application, such as a chat and video conference application 450 in FIG. 4. The client device 340 may be a personal computer such as a desktop or laptop, a mobile device, or other computing device having at least a processor, non-transitory memory, a user input system, and communication interface, providing network connectivity.

The master chat panel 500 may include a general dashboard 505, a chat control dashboard 545, a sidebar 515, a chat window 550, a reply dashboard 560, and a reply panel 555. The general dashboard 505 may include one or more buttons or links that switch functionalities and/or views of the master chat panel 500. For example, FIG. 5 shows a chat view, perhaps in response to a user command selecting a chat button 510 in the general dashboard 505. In this view, the chat window 550, the reply panel 555, and other components illustrated in FIG. 5 may be displayed on the client device 340. In other examples, a contacts button may be selected by a user. In response the contacts button being selected, the chat window 550, the reply dashboard 560 and the reply panel 555 may be replaced by a display of a contacts window including a list of user contacts associated with the user of the client device. The sidebar 515 may be displayed alongside the contacts window. Other configurations are also possible. Various buttons on the general dashboard 505 may correspond to various displays of windows being displayed on the client device 340. Any number of components shown in FIG. 5 may be displayed on the client device 340 with any of the various windows. Similarly, any of the components may cease to be displayed in accordance with any of the windows.

The sidebar 515 may include one or more chat channel headings. A chat heading may include one or more chat channels such as the chat channel 504a-b. In some examples, the chat channel may include a private chat 504a, where the chat is between the user associated with the client device 340 and another user. Messages sent and received via the chat channel 504a may only be accessed by the users in the chat channel 504a. Thus, the client devices 340 associated with the user and the client device 340 associated with the other user may securely communicate with each other. In some examples, the chat channel may by a group chat 504b, where two or more users have access to send and receive messages within the chat channel. In some examples, the chat channel 504b may only be accessed by users who have permission to enter the chat channel. A host of the chat channel 504b and/or the chat and video conference provider 310 may grant access to the chat channel 504b. Although only the chat channel headings including chat channels 504a-b are shown, other chat channel headings are possible. For example, some examples may include a chat channel heading that displays, on the client device 340, only those channels that the user associated with the client device 340 is a member of that have been recently accessed. "Recently accessed" may be determined by the client device 340 to be a fixed number of most recent channels accessed by the user, or may be only those channels access within a certain time, calculated from the current time.

The sidebar 515 may include an application heading. The application heading may include one or more independent applications integrated into the chat application (e.g., chat and video conference application 450) as microservices. The independent applications can be provided by the chat and video conference provider 310. Alternatively, or additionally, the independent applications can be provided by a third-party provider. In some examples, the one or more independent applications include a facilitation application 508 configured to identify action items from chat messages, for example using the user facilitation engine 460 as described in FIG. 4.

The sidebar 515 may also include one or more combinatory headings, such as starred combinatory heading 506. A combinatory heading may aggregate one or more messages from one or more chat channels, according to a predetermined criterion. The combinatory headings may include a link that, in response to a user command, cause the client device to display one or more messages in the chat window 550. The messages may be gathered from one or more chat channels, such as the chat channel 504a-b, and displayed based on predetermined criteria. In FIG. 5, for example, the starred combinatory heading 506 may gather only those messages that have been marked by a user of the client device 340. The marked messages may be stored at the client device 340, and/or may be stored at the chat and video conference provider 310. The link may cause the one or more processors included on the client device 340 to determine which messages are marked messages and cause them to be displayed in the chat window 550. In some examples, the link may cause the client device 340 to send a signal to the chat and video conference provider 310. The chat and video conference provider 310 may then determine which messages are marked messages and send information to the client device 340 to generate a display of the marked messages in the chat window 550.

Other combinatory headings (and associated links and functionality) are also considered. Other examples may include an unread heading, an all files heading, a contact request heading, and others. As with the starred combinatory heading 506, an associated link may cause the client device 340 and/or the chat and video conference provider 310 to determine which messages (if any) meet predetermined criteria associated with the combinatory heading and subsequently display those messages on the client device 340.

The chat control dashboard 445 may display one or more control buttons and/or information regarding the chat channel currently being displayed on the client device. The control buttons may include links that mark a message (e.g., to mark it such that it is determined to be a marked message via the starred combinatory heading 406), begin a video conference, schedule a meeting, create a video message, or other tasks. The chat control dashboard may also include a title of the chat channel currently being displayed on the client device and/or a number of users with access to the chat channel. One of ordinary skill in the art would recognize many different possibilities and configurations.

The reply panel 555 may include an input field, where the user may cause the client device 340 to send a message to the chat channel. The input field may be accessed by a peripheral device such as a mouse, a keyboard, a stylus, or any other suitable input method. In some examples, the input field may be accessed by a touchscreen or other system built into the client device. In some examples, a notification may be sent from the client device 340 and/or the video conference provider 310 that indicates a response is being entered into the input field by the user. In other examples, no notification may be sent.

The reply dashboard 560 may include one or more buttons that, in response to a user command edit or modify a response input into the input field. For example, a record button may be provided, that allows the client device to capture audio and video. In other examples, there may be a share button that causes the client device to send the message to a different chat channel. In yet another example, there may be a reaction button that causes an image to be sent by the client device to the chat channel in response to a message posted in the chat channel.

In some examples, there may be one or more formatting buttons included on the reply dashboard 560. The one or more formatting buttons may change the appearance of a replay entered in the input field. The user may thereby edit and customize their response in the input field before sending.

The reply dashboard 560 may include a send button 570. The send button 570 may, in response to a user command, cause the client device 340 to send the contents of the input field (or "response") to the chat channel. The client device 340 may then send the response to the chat and video conference provider 310. The chat and video conference provider 310 may then send the response to the chat channel, which publishes the response for the users in the channel. The response may include image files such as JPEG, PNG, TIFF, or files in any other suitable format. The response may also include video files such as MPEG, GIF, or video files in any other suitable format. The response may also include text entered into the input field and/or other files attached to the message such as a PDF, DOC, or other file format.

The master chat panel 500 may include menus 535. The menu 535 may include one or more buttons, which add functionality to the messages in the chat channels and/or the chat channels themselves. The menu 535 may be displayed in response to a user request on the client device. In the illustrated example, the user may have requested the menu 535 associated with a design team chat channel 504b. The user may have requested the menu 535 from the client device using the cursor 540. In some examples, mousing over a channel may cause the menu 535 to be displayed. In other examples, the menu 535 may be displayed in response to another user input (e.g., a right-click on the mouse while hovering over the design team chat channel 504). In other examples, the menu 535 may be displayed by a user input occurring in another space rather than the design team chat channel 504. For example, the menu 535 may be brought up by an input in a blank space of a chat window 550. One of ordinary skill in the art would recognize many different possibilities.

The menu 535 may include options associated with a chat channel. Those options may include starting a video conference (or "meeting"), scheduling a meeting, adding or removing members from the chat channel, changing setting associated with notifications sent to the client device, no longer displaying the chat channel in sidebar 515, recording a video message, and other such options. In some examples, the menu 535 may include options for a specific chat within the chat channel. For example, the menu 535 may include an option to mark a message as unread. As another example, the menu 535 may include an option to enable or disable facilitating user actions associated with chat sessions.

Although the menu 535 is illustrated as being opened from the design team chat channel 504b on the sidebar 515, the menu 535 may be opened from elsewhere. The menu 535 may display the same functions or different functions depending on where it is opened. For example, there may be a button on the chat control dashboard 545 that causes the client device to open the menu 535. Opening the menu 535 from the chat control dashboard 545 may only display functions related to a video meeting, for example. Functions related to a specific message in the chat may only be displayed in the menu 535 if the client device receives a user input on the specific message.

Figure 6:
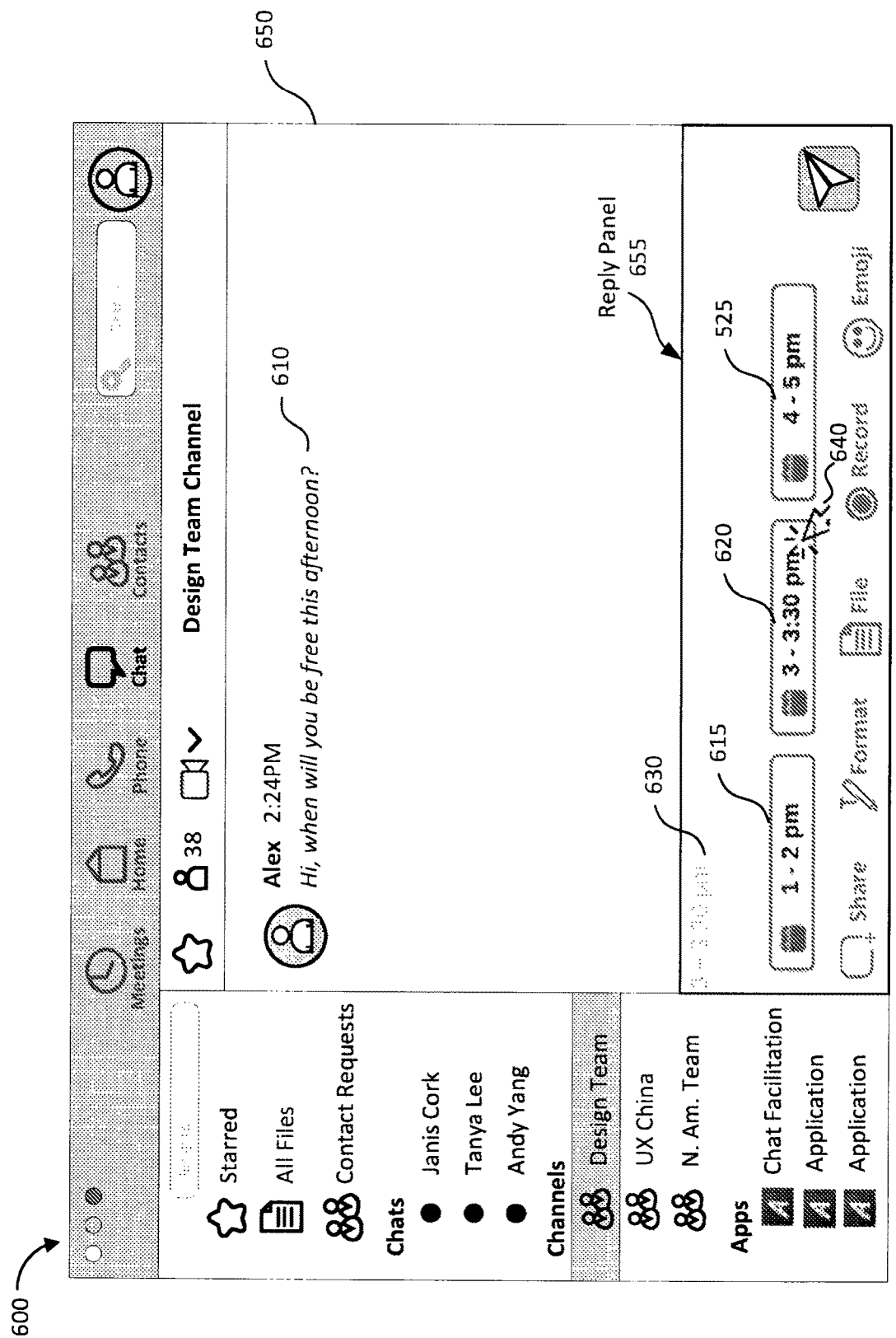
FIG. 6 shows an example master chat panel displaying GUI elements and suggested reply message associated with an identified action item.

Now referring to FIG. 6, FIG. 6 shows an example master chat panel 600 displaying GUI elements and suggested reply message associated with an identified action item. The master chat panel 600 may be similar to the master chat panel 500 in FIG. 5 and therefore include some or all of the components and functionalities included therein. In this example, the chat window 650 includes a chat message 610. The chat message 610 is from a user called "Alex", not the local user logged in the master chat panel 600. The chat message 610 asks the local user "when will you be free this afternoon?" The user facilitation engine 460 of the chat and video conference application can identify an action item that is to check the calendar based on the chat message 610. The user facilitation engine 460 accesses the user's calendar and creates three GUI buttons for three available timeframes based on the user's calendar. GUI button 615 indicates 1-2 pm and can be activated (e.g., by clicking) to access the calendar and set up a meeting from 1 pm to 2 pm. Similarly, GUI button 620 indicates 3-3:30 pm and can be activated to set up a meeting from 3 pm to 3:30 pm in the calendar. GUI button 625 indicates 4-5 pm and can be activated to set up the meeting from 4 pm to 5 pm. The three GUI buttons 615, 620, and 625 are displayed in the reply panel 655 for the user to select based on the user's preference. The user does not need to go to the calendar to check the available times separately. When one GUI button is selected or the cursor is clicked on one GUI button, a reply message can be automatically composed based on the corresponding timeframe. For example, when the cursor 640 is clicked on the GUI button 620, a reply message 630 is automatically composed to included 3-3:30 pm from the GUI button 620. The user may edit the reply message 630 before sending it to the chat window 650.

Figure 7:
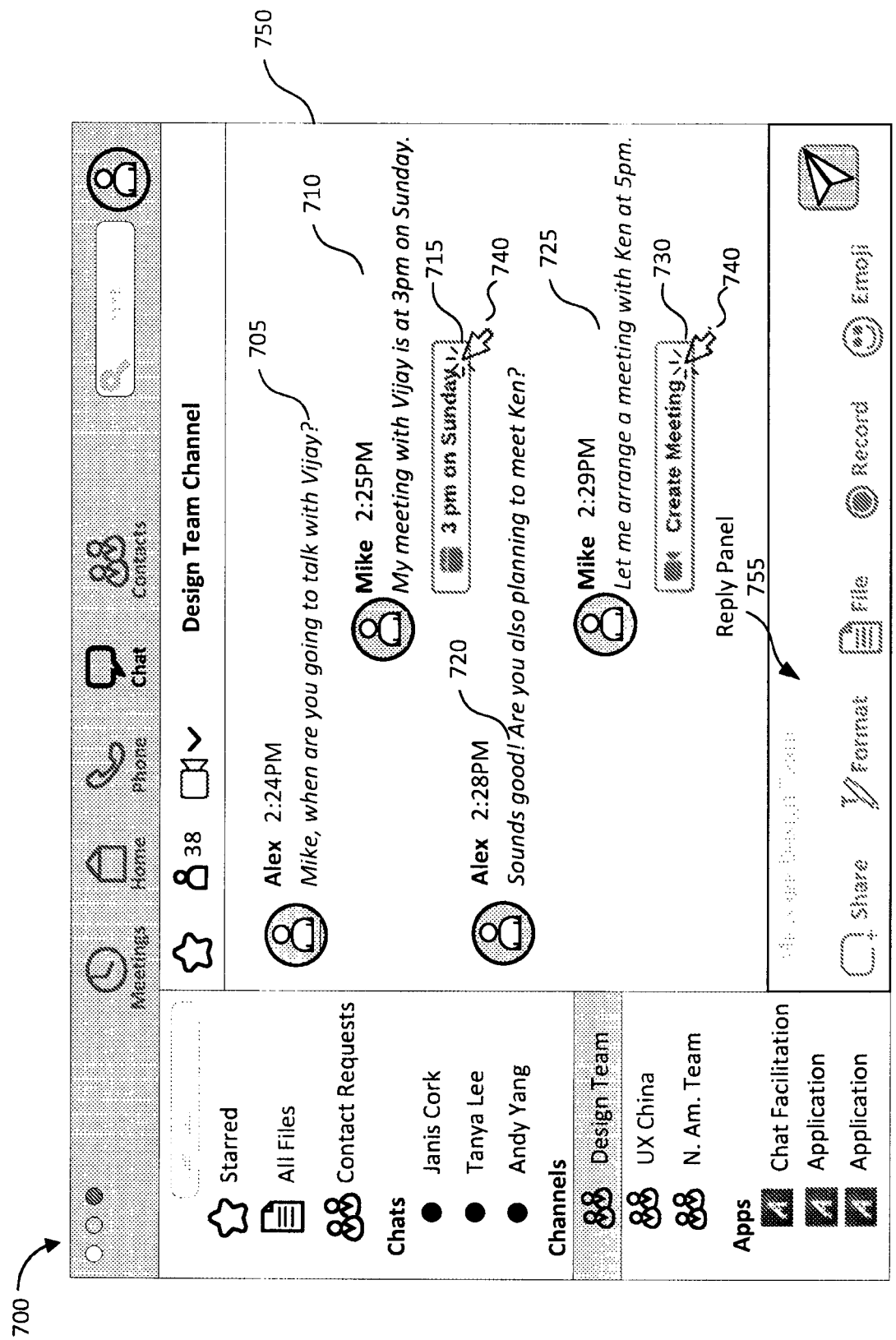
FIG. 7 shows an example master chat panel displaying GUI elements with an identified action item in the chat window.

Now referring to FIG. 7, FIG. 7 shows an example master chat panel 700 displaying GUI elements with an identified action item in the chat window 750. Chat message 705 is similar to chat message 610 in FIG. 6. The reply message 710 and the GUI button 715 may first appear in the reply panel 755 (not shown in FIG. 7), similar to the reply message 630 and the GUI buttons 615-625 in FIG. 6. For example, the user facilitation engine 460 identifies an action item to check the local user (e.g., Mike) calendar and generates a GUI button 715 indicating the meeting with Vijay scheduled at 3 pm on Sunday in the local user's calendar. The GUI button 715 can be activated to open the meeting schedule in the local user's calendar. The reply message 710 can be automatically composed based on the scheduled meeting. The local user can edit the reply message 710 and send it to the chat window 750. Meanwhile, the GUI button 715 can also be displayed in the chat window 750 below the reply message 710. The user may double check the schedule by clicking the GUI button 715.

The chat message 720 asks the local user "Are you also planning to meet Ken?" The user facilitation engine 460 may identify an action item to check the local user's calendar for meeting with Ken. The user facilitation engine 460 may not find any meeting scheduled with Ken, but have suggested some available timeframes (not shown) based on the meeting time with Vijay, similar to the GUI buttons 615-625. The user sends a reply message 725 "Let me arrange a meeting with Ken at 5 pm." The user facilitation engine 460 can generate an action item to create a video meeting and generate a GUI button 730. The GUI button 730 can be activated by clicking the cursor 640 at the GUI button. Then the user can create a meeting directly without navigating to a different application or GUI. The user facilitation engine 460 may automatically compose the content in different fields of the scheduling page (not shown) based on the reply messages 725.

Figure 8:
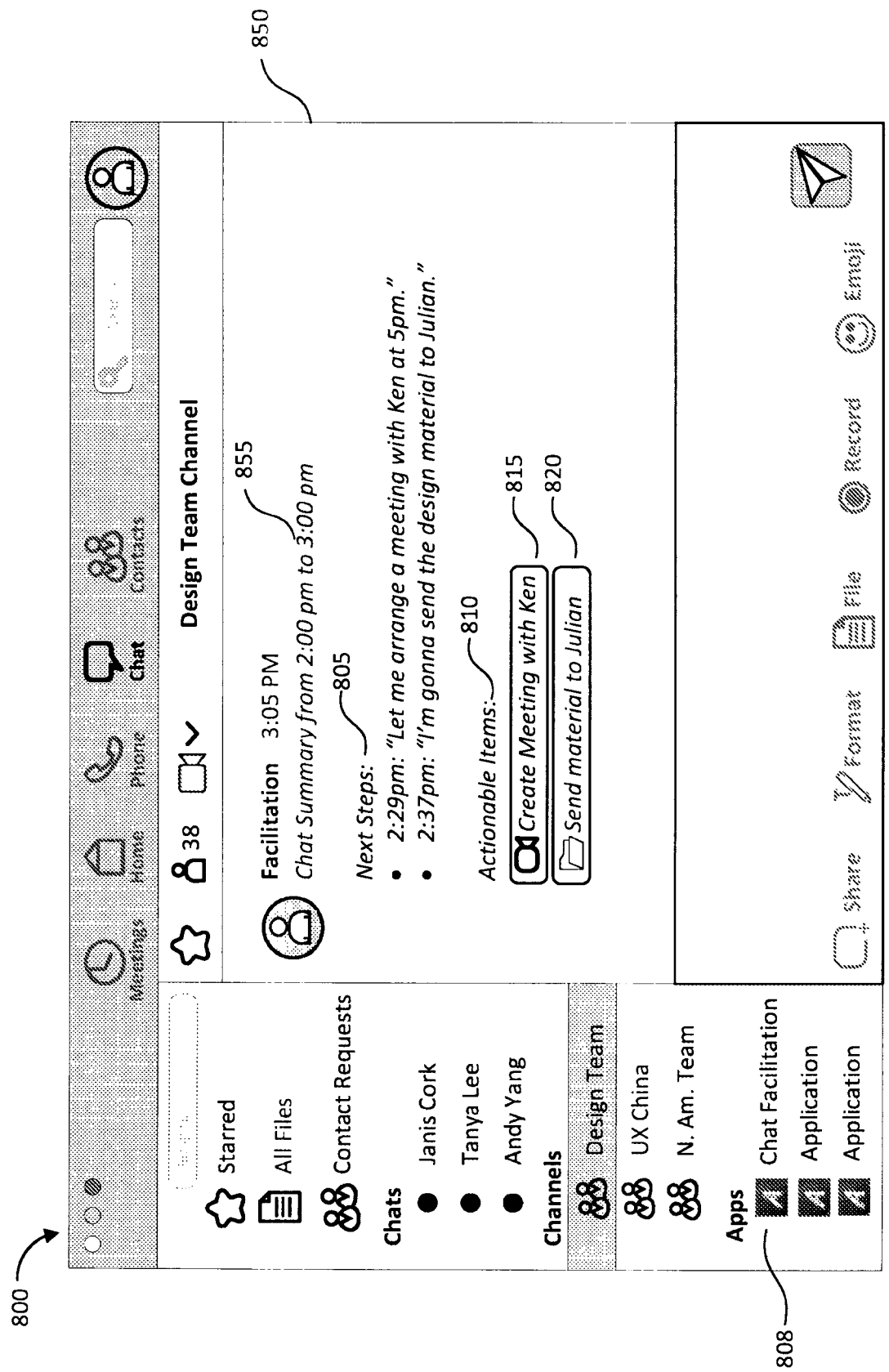
FIG. 8 shows an example master chat panel displaying a chat summary message in the chat window of the design team chat channel.

Now referring to FIG. 8, FIG. 8 shows an example master chat panel 800 displaying a chat summary message 855 in the chat window 850 of the design team chat channel. The master chat panel 800 may be similar to the master chat panel 500 in FIG. 5 and therefore include some or all of the components and functionalities included therein. In this example, the chat window 850 of the design team channel includes a chat summary message 855. The chat summary message 855 is generated by the user facilitation engine 460 as described in FIG. 4, for example from an external application (e.g., chat facilitation application 808), and is only visible to the user associated with the client device 340. The chat summary message 855 includes a list of next steps 805, such as "Let me arrange a meeting with Ken at 5 pm" and "I'm gonna send the design material to Julian," which are chat messages from the chat session from 2:00 to 3:00 pm. The chat summary message 855 also includes a list of actionable items 810, such as a GUI button 815 for creating a meeting with Ken and a GUI button 820 for sending material to Julian. The GUI button 815 can be activated (e.g., by a mouse click) to invoke a user interface for scheduling a virtual meeting. The GUI button 820 can be activated (e.g., by a mouse click) to open a folder where the design material is saved.

Figure 9:
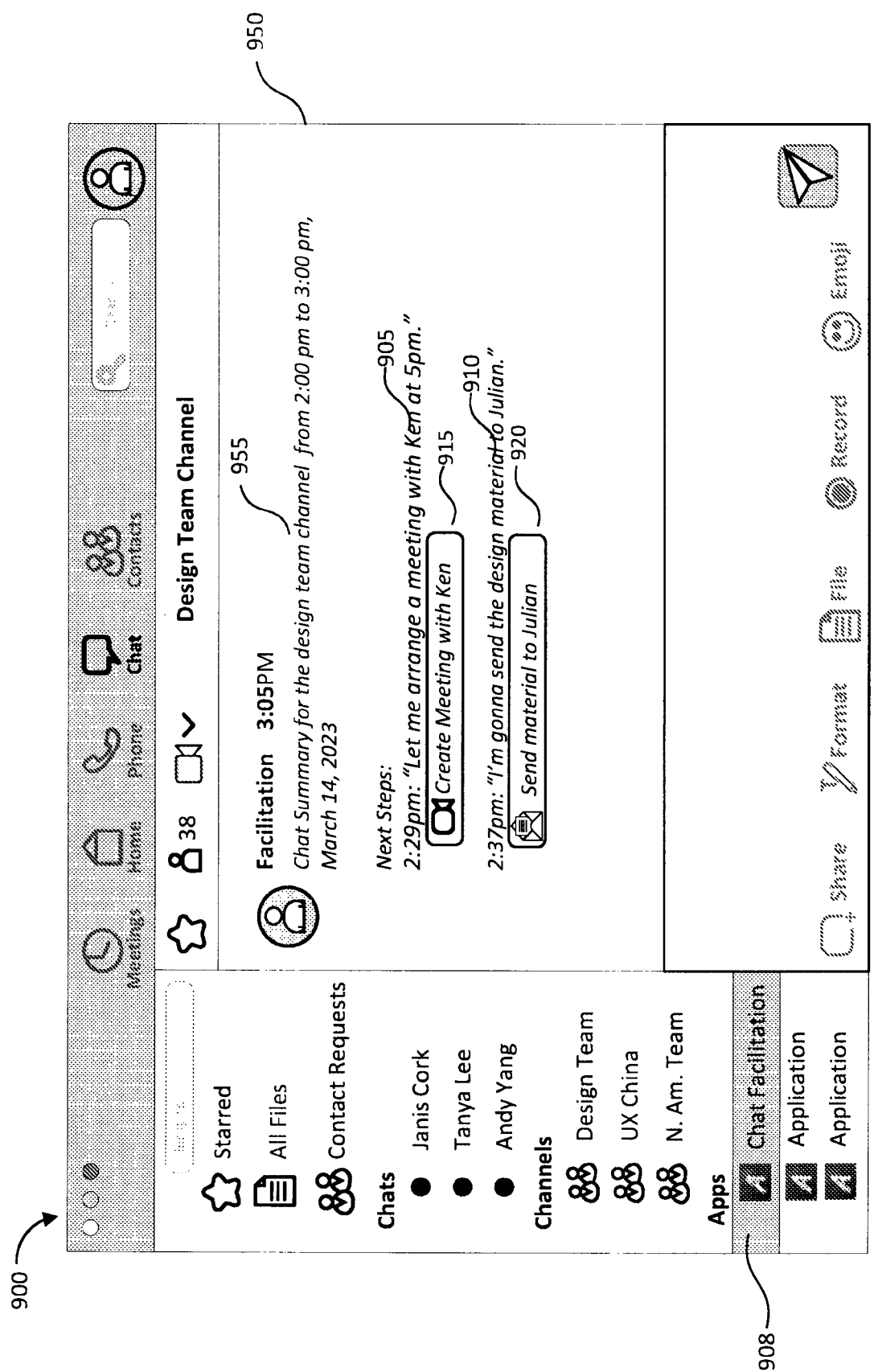
FIG. 9 shows an example master chat panel displaying a chat summary message in an external application page.

Now referring to FIG. 9, FIG. 9 shows an example master chat panel 900 displaying a chat summary message 955 in an external application page 950. The master chat panel 900 may be similar to the master chat panel 500 in FIG. 5 and therefore include some or all of the components and functionalities included therein. In this example, the external application page 950 includes a chat summary message 955. The chat summary message 955 is generated by an external application (e.g., chat facilitation application 908), and is only visible to the user associated with the client device 340. The chat summary message 955 include information about the chat channel and time. The chat summary message 955 can be similar to the chat summary message 855 in FIG. 8, including a list of next steps and a list of actionable items. In this example, an actionable item is next to a corresponding next step. For example, next step 905 is from a chat message "Let me arrange a meeting with Ken at 5 pm." A GUI button 915 can be activated (e.g., by a mouse click) to invoke a user interface for scheduling a virtual meeting. Also as an example, next step 910 is from a chat message "I'm gonna send the design material to Julian." A GUI button 920 can be activated (e.g., by a mouse click) to open an email window for sending the design material to Julian. Julian's email address can be automatically filled in the recipient field, and the subject line can be automatically filled. The design material can be attached automatically to the email.

Figure 10:
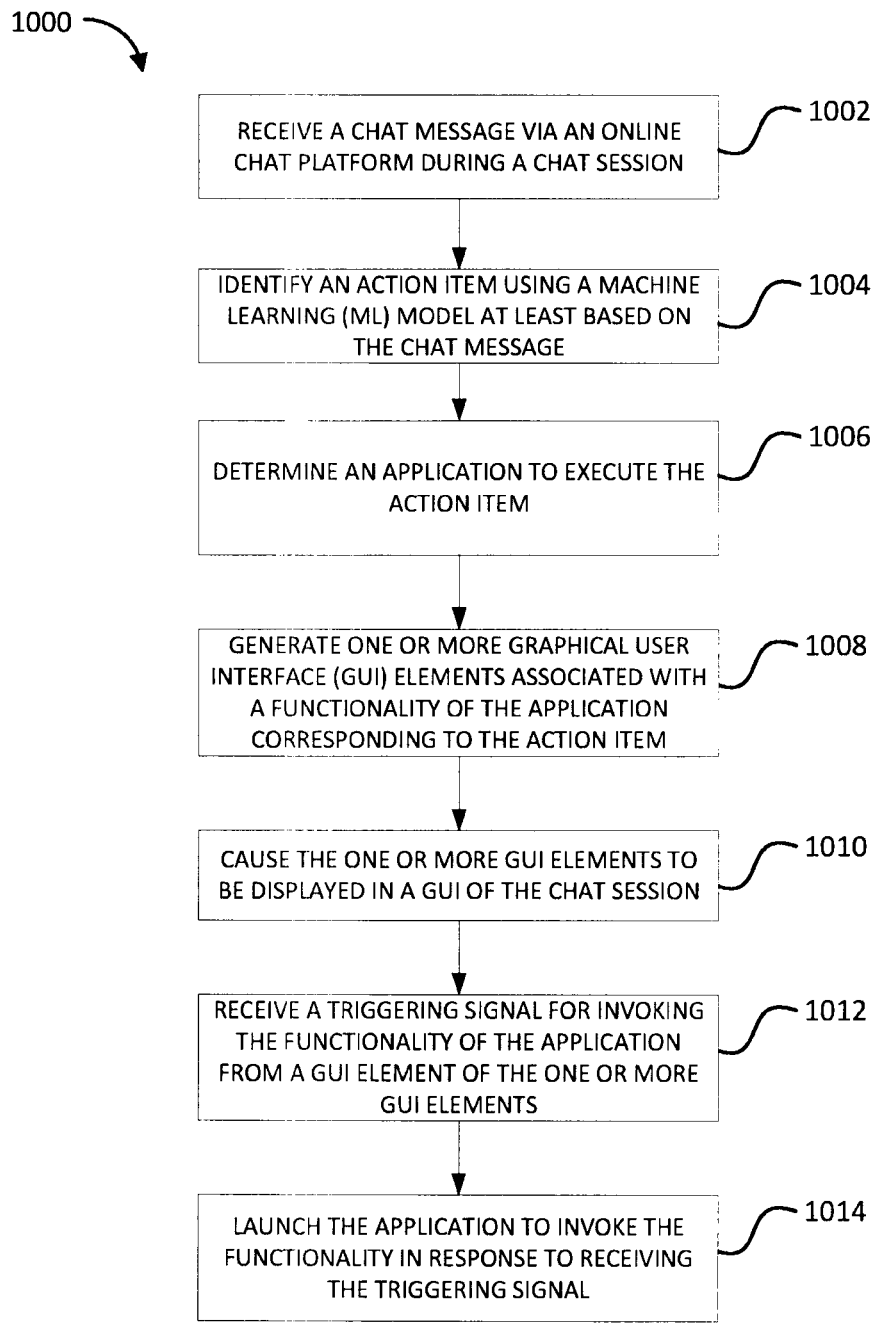
FIG. 10 shows an example method for facilitating user actions during a chat session.

Now referring to FIG. 10, FIG. 10 shows an example method 1000 for facilitating user actions during a chat session. The example method 1000 will be discussed with respect to the system 400 shown in FIG. 4; however, any suitable system for facilitating user actions may be used.

At block 1002, a client device 340 receives a chat message via an online chat platform during a chat session. The online chat platform can be provided by the chat and video conference provider 310. The client device 340 can access the online chat platform via a client-side application, for example a chat and video conference application 450 provided by the chat and video conference provider 310 and installed on the client device 340. The chat message is from the chat session. The chat session can be a chat between different users in a chat channel. The chat message can be a text, an image, an audio clip, a video clip, or in any other suitable format. The chat message can be from a local user associated with the client device 340 via an input device of the client device 340, for example, a mouse, a keyboard, a touchscreen, a microphone, a camera. Alternatively, the chat message is from another user in the chat session via another client device. The chat message is sent to chat and video conference application 450 installed on the client device 340 by the chat and video conference provider 310.

At block 1004, the client device 340 identifies an action item using an ML model at least based on the chat message. The ML model can be a classification model. The ML model can be initially trained by the chat and video conference provider 310 for classification. In some examples, the classification model is a rule-based model. In some examples, the ML model is trained in a supervised learning process, where category labels are provided so that the ML model learns certain features from the input data labeled with a particular action category. Alternatively, or additionally, the ML model is trained during an unsupervised learning process, wherein the ML model learns certain features and identifies a corresponding action category. The chat and video conference provider 310 then transmits the trained ML model to the user facilitation engine 460 of the chat and video conference application 450 installed on the client device 340. The user facilitation engine 460 implements the trained ML model to identify an action item from the chat message. In some examples, one or more chat messages prior to the chat message during the chat session are also used by the ML model to identify the action item.

In some examples, the chat and video conference provider 310 identifies an action item from the chat message. The chat and video conference provider 310 can include an action facilitation engine 430 configured to identify action items. The action facilitation engine 430 can implement a trained ML model from the model store 420. For example, the ML model is a trained classification model, generally as described above.

At block 1006, the client device 340 determines an application to execute the action item. In some examples, the application is a third-party application integrated with the chat and video conference application 450. The chat and video conference application 450 can request access to other applications installed on the client device 340. The chat and video conference application 450 can access these applications via APIs. In some examples, the application is the chat and video conference application 450 itself. The action item may be executed by a different functionality of the chat and video conference application 450, such as video conferencing, phone calls, and any other suitable functions provided by the chat and video conference application 450. The user facilitation engine 460 can determine what application installed on the client device 340 can execute the action indicated in the action item. For example, the action item is to check available times on calendar. The facilitation engine 360 determines which integrated application includes a calendar for the user. The integrated application can be an Outlook® calendar, Google® calendar, or any other calendar. In some examples, the chat and video conference provider 310 determines an application to execute the action item. In some examples, the ML model implemented by the action facilitation engine 430 includes a map between action categories and functionalities of applications or applications that can execute corresponding action items. In some examples, applications or functionalities of certain applications can be inferred from the action items identified by the ML model.

At block 1008, the client device 340 generates one or more GUI elements associated with a functionality of the application corresponding to the action item. The user facilitation engine 460 can be configured to generate GUI elements based on the identified action items and associated applications or functionalities of certain applications. The one or more GUI elements can include an indication of the functionality of the application corresponding to the action item. The one or more GUI elements can be a button, a check box, a drop list, or in any other suitable formats. The one or more GUI element can include a description of the action item and an icon of the application that can execute the action indicated in the action item. The one or more GUI elements can trigger a functionality of the application that can execute the action indicated by the action item. In some examples, the action facilitation engine 430 identifies the action items and determines the associated applications or functionalities of the applications that can execute the action items. The action facilitation engine 430 can transmit the information about the identified action items and associated application (or functionality thereof) to the user facilitation engine 460. The user facilitation engine 460 then generates one or more GUI elements associated with a functionality of the application corresponding to the action item.

At block 1010, the client device 340 causes the one or more GUI elements to be displayed in a GUI of the chat session. In some examples, the chat message is from another user, the one or more GUI elements are generated for the local user associated with client device 340 to facilitate replying to the chat message received. The one or more GUI elements can then be displayed in a reply panel for the user's reference, for example GUI buttons 615-625 in FIG. 6. In some examples, the chat message is from the local user associated with the client device 340, the one or more GUI elements are generated to facilitate an action identified in the local user's chat message. The one or more GUI elements can then be displayed under the chat message in the chat window, for example GUI button 730 in FIG. 7.

At block 1012, the client device 340 receives a triggering signal for invoking the functionality of the application from a GUI element of the one or more GUI elements.

The GUI element can be activated by a mouse click, a finger press, a stylus, a keystroke, or any suitable means. A triggering signal can be generated by the GUI element being activated. The triggering signal is to invoke the functionality of the application associated with the GUI element being activated. In some examples, the user facilitation engine 460 of the client device 340 can automatically compose a chat message based on the functionality of the application invoked by the triggering signal, for example the reply message 630 in FIG. 6.

At block 1014, the client device 340 launches the application to invoke the functionality in response to receiving the triggering signal. The application can be automatically launched to invoke the function by activating a corresponding GUI element. A user interface or a window associated with the functionality can be displayed on the client device 340. For example, a scheduling page can pop up for the user to schedule a meeting identified in the chat message.

In some examples, the user facilitation engine 460 identifies several action items from multiple chat messages during the chat session and creates corresponding GUI elements for the action items. Some of the GUI elements are activated to execute the actions indicated in corresponding action items during the chat session. Some of the GUI elements are not activated during the chat session. The user facilitation engine 460 can also identify some action items without corresponding GUI elements, but they include actions to be taken by the user. In some examples, the user facilitation engine 460 creates a summary for the chat session after the chat session is ended. The summary can be sent to the chat window of the chat session. Alternatively, the summary can be sent to a page associated with the integrated facilitation application. Still alternatively, the summary can be sent in an email or other communication mean. The summary includes quotes of chat messages indicating user actions. Some of these quoted chat messages correspond to a GUI element, either activated or not activated yet. Some of these quoted chat messages do not have corresponding GUI elements, indicating that the actions indicated in the quoted chat message may not be carried out by an application in the client device 340. The summary may also include a feedback request. The user facilitation engine 460 can create a blank field at the end of the summary message for soliciting feedback from the user. Alternatively, or additionally, the facilitation engine can include radio buttons for action item identified in the summary for user feedback. It can be understood that other formats of feedback inputs are also possible.

Figure 11:
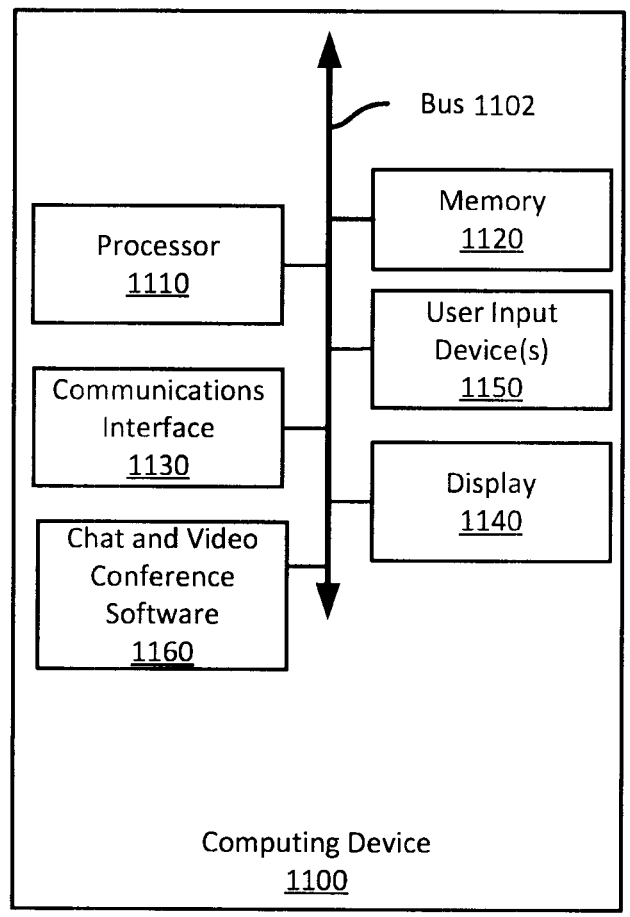
FIG. 11 shows an example computing device suitable for use in example systems or methods for facilitating user actions for virtual interactions, according to certain examples.

Now referring to FIG. 11, FIG. 11 shows an example computing device 1100 suitable for use in example systems or methods for facilitating user actions for virtual interactions. The example computing device 1100 includes a processor 1110 which is in communication with the memory 1120 and other components of the computing device 1100 using one or more communications buses 1102. The processor 1110 is configured to execute processor-executable instructions stored in the memory 1120 to perform one or more methods for facilitating user actions for virtual interactions, such as part or all of the example method 1000, described above with respect to FIG. 10. The computing device, in this example, also includes one or more user input devices 1150, such as a keyboard, mouse, touchscreen, video input device (e.g., one or more cameras), microphone, etc., to accept user input. The computing device 1100 also includes a display 1140 to provide visual output to a user. The computing device 1100 may also include a chat and video conference software 1160. The chat and video conference software 1160 may include a chat client, a video conference platform, and any other software to enable communication from a first user to a second user.

The computing device 1100 also includes a communications interface 1130. In some examples, the communications interface 1130 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium include an electronic, optical, magnetic, or other storage device capable of providing a processor, such as the processor in a web server, with processor-executable instructions. Other examples of non-transitory computer-readable media include a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
    accessing, by a client device associated with a first participant in a chat session, a chat message via an online chat platform;
    identifying, by the client device associated with the first participant in the chat session, an action item for the first participant using a trained machine learning (ML) model at least based on the chat message;
    determining, by the client device associated with the first participant in the chat session, an application to execute the action item;
    generating, by the client device associated with the first participant in the chat session, one or more graphical user interface (GUI) elements associated with a functionality of the application to execute the action item;
    causing, by the client device associated with the first participant in the chat session, the one or more GUI elements to be displayed in a GUI of the client device associated with the first participant in the chat session;
    receiving, by the client device associated with the first participant in the chat session, a triggering signal for invoking the functionality of the application corresponding to a GUI element of the one or more GUI elements;
    receiving, from the first participant by the client device associated with the first participant in the chat session, user feedback data related to the one or more GUI elements associated with the functionality of the application corresponding to the action item;
    executing, by the client device associated with the first participant in the chat session, the application to invoke the functionality in response to receiving the triggering signal; and
    generating, by the client device associated with the first participant after the chat session, a chat summary, comprising a plurality of chat messages from the chat session indicating a plurality of action items and a plurality of GUI elements associated with one or more applications to execute the plurality of action items respectively.

2. The method of claim 1, wherein the chat message is from an input device associated with the client device.

3. The method of claim 1, wherein the chat message is from a second client device associated with a second participant in the chat session.

4. The method of claim 1, wherein the ML model is a classification model.

5. The method of claim 1, wherein the action item is identified further based on one or more chat messages prior to the chat message during the chat session.

6. The method of claim 1, wherein the triggering signal is generated by the GUI element being activated.

7. The method of claim 1, wherein the GUI element comprises an indication of the functionality of the application corresponding to the action item.

8. The method of claim 1, further comprising:
    automatically composing a second chat message based on the functionality of the application invoked by the triggering signal.

9. The method of claim 1, further comprising:
    identifying one or more action items using the ML model based on a plurality of chat messages from the chat session;
    determining a second application to execute associated with at least one of the one or more action items;
    generate a second GUI element associated with a second functionality of the second application corresponding to the at least one of the one or more action items;
    causing the second GUI element and the at least one of the one or more action items to be displayed in a GUI of the online chat platform after the chat session;
    receiving a second triggering signal for invoking the second functionality of the second application from the second GUI element; and
    launching the second application to invoke the second functionality in response to receiving the second triggering signal.

10. The method of claim 9, further comprising:
presenting a list of the one or more action items in the GUI of the online chat platform.

11. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
access a chat message via an online chat platform during a chat session;
identify an action item for a first participant in the chat session using a trained machine learning (ML) model at least based on the chat message during the chat session;
determine an application to execute the action item during the chat session;
generate one or more graphical user interface (GUI) elements associated with a functionality of the application to execute the action item during the chat session;
cause the one or more GUI elements to be displayed in a GUI of a client device associated with the first participant in the chat session;
receive a triggering signal for invoking the functionality of the application corresponding to a GUI element of the one or more GUI elements during the chat session;
receive, from the client device associated with the first participant in the chat session, user feedback data related to the one or more GUI elements associated with a functionality of the application corresponding to the action item;
launch the application to invoke the functionality in response to receiving the triggering signal during the chat session; and
generate a chat summary, comprising a plurality of chat messages from the chat session indicating a plurality of action items and a plurality of GUI elements associated with one or more applications to execute the plurality of action items respectively.

12. The system of claim 11, wherein the ML model is a classification model.

13. The system of claim 11, wherein the action item is identified further based on one or more chat messages prior to the chat message during the chat session.

14. The system of claim 11, wherein the triggering signal is generated by the GUI element being activated.

15. The system of claim 11, wherein the GUI element comprises an indication of the functionality of the application corresponding to the action item.

16. The system of claim 11, wherein the one or more processors are configured to execute further processor-executable instructions stored in the non-transitory computer-readable medium to:
identify multiple action items using the ML model based on a plurality of chat messages from the chat session;
determine at least one application to execute at least one of the multiple action items;
generate at least one GUI element associated with at least one functionality of the at least one application corresponding to the at least one of the multiple action items; and
causing the at least one GUI element to be displayed in a GUI of the online chat platform after the chat session, wherein the at least one GUI element is configured to be activated to invoke the at least one functionality of the at least one application correspondingly.

17. A non-transitory computer-readable medium comprising processor-executable instructions configured to cause one or more processors to:
access a chat message via an online chat platform during a chat session;
identify an action item for a first participant in the chat session using a trained machine learning (ML) model at least based on the chat message during the chat session;
determine an application to execute the action item during the chat session;
generate one or more graphical user interface (GUI) elements associated with a functionality of the application corresponding to the action item during the chat session;
cause the one or more GUI elements to be displayed in a GUI of a client device associated with the first participant in the chat session;
receive a triggering signal for invoking the functionality of the application corresponding to a GUI element of the one or more GUI elements during the chat session;
receive, from the client device associated with the first participant in the chat session, user feedback data related to the one or more GUI elements associated with a functionality of the application corresponding to the action item;
launch the application to invoke the functionality in response to receiving the triggering signal during the chat session; and
generate a chat summary, comprising a plurality of chat messages from the chat session indicating a plurality of action items and a plurality of GUI elements associated with one or more applications to execute the plurality of action items respectively.

18. The non-transitory computer-readable medium of claim 17, wherein the ML model is a classification model, wherein the action item is identified further based on one or more chat messages prior to the chat message during the chat session.

19. The non-transitory computer-readable medium of claim 17, further comprising processor-executable instructions configured to cause one or more processors to:
automatically compose a second chat message based on the functionality of the application invoked by the triggering signal.

20. The non-transitory computer-readable medium of claim 17, further comprising processor-executable instructions configured to cause one or more processors to:
identify multiple action items using the ML model based on a plurality of chat messages from the chat session;
determine at least one application to execute at least one of the multiple action items;
generate at least one GUI element associated with at least one functionality of the at least one application corresponding to the at least one of the multiple action items; and
causing the at least one GUI element to be displayed in a GUI of the online chat platform after the chat session, wherein the at least one GUI element is configured to be activated to invoke the at least one functionality of the at least one application correspondingly.

* * * * *